United States Patent
Kang et al.

(10) Patent No.: US 7,540,270 B2
(45) Date of Patent: Jun. 2, 2009

(54) METHOD AND APPARATUS FOR CONTROLLING COMBUSTION MODE TRANSITIONS IN AN INTERNAL COMBUSTION ENGINE

(75) Inventors: Jun-Mo Kang, Ann Arbor, MI (US); Chen-Fang Chang, Troy, MI (US); Jyh-Shin Chen, Troy, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/739,159

(22) Filed: Apr. 24, 2007

(65) Prior Publication Data

US 2008/0264380 A1 Oct. 30, 2008

(51) Int. Cl.
*F02B 17/00* (2006.01)
*F01L 1/34* (2006.01)
*F02D 41/18* (2006.01)

(52) U.S. Cl. .................... 123/295; 123/399; 123/90.15; 123/568.14

(58) Field of Classification Search ................. 123/295, 123/305, 399, 90.11, 90.15, 443, 568.11, 123/568.14; 73/114.31–114.33, 114.36–114.37, 73/114.58, 114.62; 701/103, 111
See application file for complete search history.

(56) References Cited

U.S. PATENT DOCUMENTS

| | | | |
|---|---|---|---|
| 6,055,948 A | 5/2000 | Shiraishi et al. | |
| 6,615,129 B2 | 9/2003 | Kabasin | |
| 6,662,785 B1 | 12/2003 | Sloane et al. | |
| 6,758,177 B1 | 7/2004 | McKay et al. | |
| 6,772,585 B2 * | 8/2004 | Iihoshi et al. | 60/277 |
| 6,971,365 B1 | 12/2005 | Najt et al. | |
| 6,994,072 B2 | 2/2006 | Kuo et al. | |
| 7,059,281 B2 | 6/2006 | Kuo et al. | |
| 7,063,068 B2 | 6/2006 | Nakai et al. | |
| 7,077,084 B2 | 7/2006 | Mallebrein | |
| 7,080,613 B2 | 7/2006 | Kuo et al. | |
| 7,128,062 B2 | 10/2006 | Kuo et al. | |
| 7,258,104 B2 * | 8/2007 | Young et al. | 123/432 |
| 7,263,968 B2 * | 9/2007 | Cairns et al. | 123/295 |
| 7,275,426 B2 * | 10/2007 | Lahti et al. | 73/118.1 |
| 2003/0192305 A1 * | 10/2003 | Iihoshi et al. | 60/277 |
| 2006/0144356 A1 | 7/2006 | Sellnau et al. | |

(Continued)

FOREIGN PATENT DOCUMENTS

JP 2001-248484 A2 9/2001

(Continued)

*Primary Examiner*—Hai H Huynh

(57) ABSTRACT

A method to control operation of an engine during a transition from a first to a second combustion mode is provided. The engine includes a controllable throttle valve, a variable valve actuation system for controlling openings and closings of intake and exhaust valves, and, an intake and an exhaust. Mass airflow, intake manifold pressure, and cylinder volume to operate the engine in the second combustion mode and meet an operator torque request are determined. Current states for mass airflow, intake manifold pressure, and cylinder volume are determined. An opening position of the controllable throttle valve and the openings and the closings of the intake and exhaust valves are controlled during the transition to the second combustion mode based upon differences between the current states for mass airflow, intake manifold pressure, and cylinder volume, and, the mass airflow, the intake manifold pressure, and the cylinder volume.

19 Claims, 3 Drawing Sheets

U.S. PATENT DOCUMENTS

| | | |
|---|---|---|
| 2006/0196466 A1 | 9/2006 | Kuo et al. |
| 2006/0196467 A1 | 9/2006 | Kang et al. |
| 2006/0196468 A1 | 9/2006 | Chang et al. |
| 2006/0196469 A1 | 9/2006 | Kuo et al. |
| 2006/0236958 A1 | 10/2006 | Sun et al. |
| 2006/0243241 A1 | 11/2006 | Kuo et al. |
| 2007/0157604 A1* | 7/2007 | Kakuya et al. ................. 60/285 |
| 2007/0272202 A1* | 11/2007 | Kuo et al. ................... 123/295 |
| 2008/0066459 A1* | 3/2008 | O'Neill ....................... 60/324 |
| 2008/0066699 A1* | 3/2008 | Michelini et al. ........ 123/90.11 |
| 2008/0066713 A1* | 3/2008 | Megli et al. ................. 123/295 |
| 2008/0281497 A1* | 11/2008 | Kumano et al. ............. 701/102 |

FOREIGN PATENT DOCUMENTS

| | | |
|---|---|---|
| KR | 10-2003-0027783 A | 4/2003 |
| KR | 10-2004-0025552 A | 3/2004 |
| KR | 10-2004-0074592 A | 8/2004 |
| KR | 10-2006-0127812 A | 12/2006 |

* cited by examiner

METHOD AND APPARATUS FOR CONTROLLING COMBUSTION MODE TRANSITIONS IN AN INTERNAL COMBUSTION ENGINE

TECHNICAL FIELD

This invention relates to internal combustion engines, and more specifically to controlling operation thereof.

BACKGROUND OF THE INVENTION

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). The HCCI combustion mode comprises a distributed, flameless, auto-ignition combustion process that is controlled by oxidation chemistry, rather than by fluid mechanics. In a typical engine operating in HCCI combustion mode, the cylinder charge is nearly homogeneous in composition, temperature, and residual level at intake valve closing time. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low $NO_x$ emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy.

At medium engine speed and load, a combination of valve profile and timing (e.g., exhaust recompression and exhaust re-breathing) and fueling strategy has been found to be effective in providing adequate heating to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise can be achieved over a range of operating conditions. The benefits of auto-ignition combustion have been known for many years. The primary barrier to product implementation, however, has been the inability to control the auto-ignition combustion process.

In a spark-ignition, direct-injection (SIDI) engine capable of operating in an auto-ignition combustion mode (SIDI/HCCI engine), engine air flow is controlled by either adjusting an intake throttle position or adjusting opening and closing times and/or profile of intake valves, using a variable valve actuation (VVA) system. An SIDI/HCCI engine having VVA, e.g., one comprising multiple-step cam lobes which provide two or more valve lift profiles, typically operates in the auto-ignited combustion mode at part-load and lower engine speed conditions and in a conventional spark-ignited combustion mode at high load and high speed conditions. These two combustion modes, however, require quite different engine operation to maintain robust combustion. For instance, in the auto-ignited combustion mode, the engine operates at lean air-fuel ratios with the throttle fully open to minimize engine pumping losses. In contrast, in the spark-ignition combustion mode, the throttle is controlled to restrict intake airflow and the engine is operated at a stoichiometric air-fuel ratio.

There is a need to have a smooth transition between these two combustion modes during ongoing engine operation, in order to maintain a continuous engine output torque and prevent any engine misfires or partial-burns during transitions.

Therefore, there is a need to control the airflow to the engine precisely, to prevent engine operation that is either too lean or too rich during transitions. It is therefore very important that there be coordination between throttle position and operation of the VVA system.

It is further desirable to control any transition between the combustion modes to achieve robust and stable combustion, low emissions, optimal heat release rate, and low noise during the transition.

The invention described hereinafter comprises a method and a control scheme to determine a preferred combustion mode for operating the engine, and controlling the engine thereto.

SUMMARY OF THE INVENTION

In accordance with an embodiment of the invention, there is provided a method and a control scheme to control operation of an engine during a transition from a first to a second combustion mode. The internal combustion engine includes a controllable throttle valve, a variable valve actuation system for controlling openings and closings of intake and exhaust valves, and, an intake and an exhaust. The method comprises determining a mass airflow, an intake manifold pressure, and a cylinder volume to operate the engine in the second combustion mode and meet an operator torque request. Current states for mass airflow, intake manifold pressure, and cylinder volume are determined. An opening position of the controllable throttle valve and the openings and the closings of the intake and exhaust valves are controlled during the transition to the second combustion mode based upon differences between the current states for mass airflow, intake manifold pressure, and cylinder volume, and, the mass airflow, the intake manifold pressure, and the cylinder volume to operate the engine in the second combustion mode and meet the operator torque request.

DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF AN EMBODIMENT OF THE INVENTION

Figure 1:
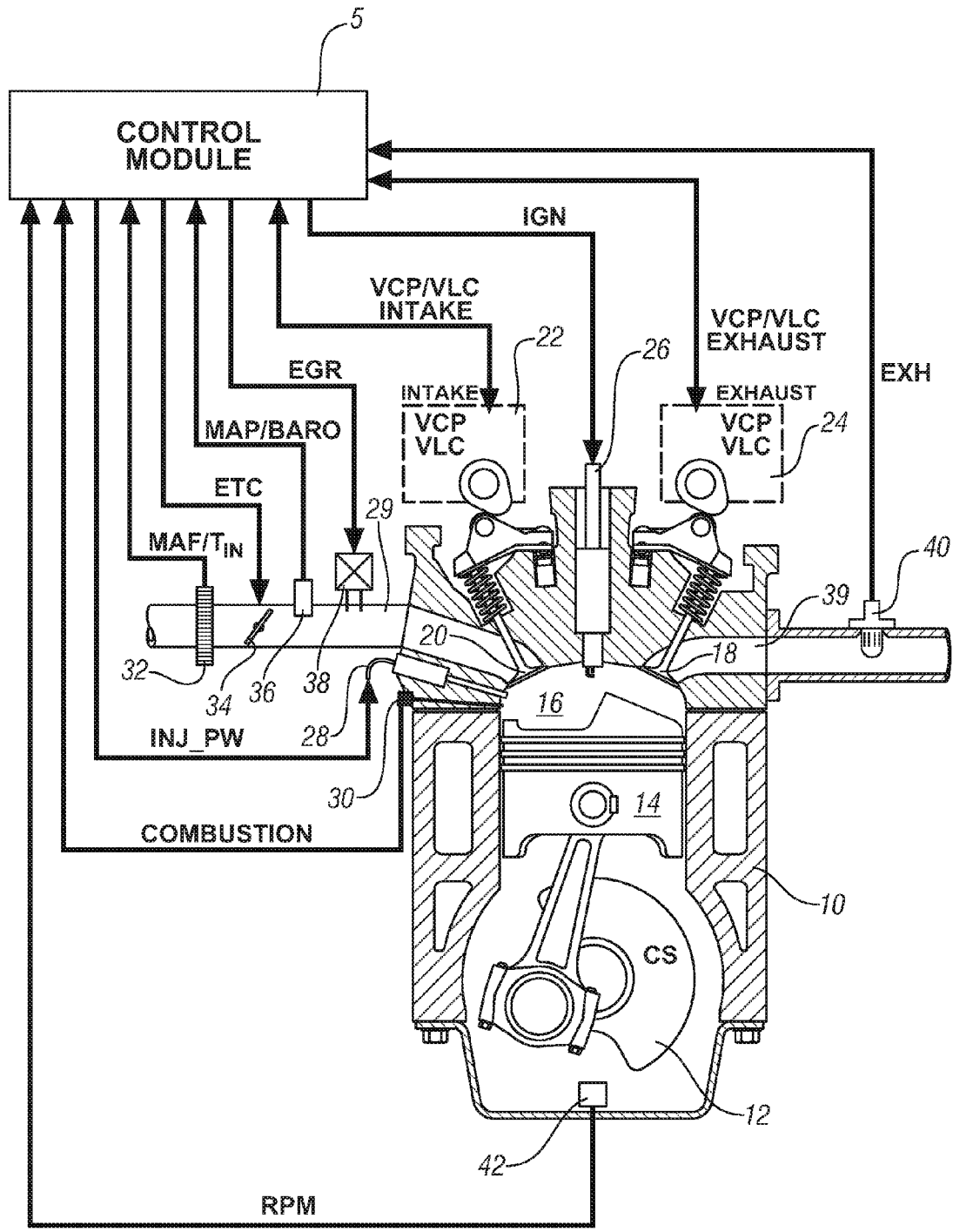
FIG. 1 is a schematic drawing of an engine system, in accordance with the present invention.

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake runner 29 to each combustion chamber 14. The air intake system comprises airflow ductwork and devices for monitoring and controlling the air flow. The devices preferably include a mass airflow sensor 32 for monitoring mass airflow ('MAF') and intake air temperature ('$T_{IN}$'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling valve lift of the intake valves and the exhaust valves, referred to as variable lift control ('VLC'). The variable valve lift system comprises devices operative to control valve lift, or opening, to one of two distinct steps, e.g., a low-lift valve opening (about 4-6 mm) for load speed, low load operation, and a high-lift valve opening (about 8-10 mm) for high speed and high load operation. The engine is further equipped with devices for controlling phasing (i.e., relative timing) of opening and closing of the intake valves and the exhaust valves, referred to as variable cam phasing ('VCP'), to control phasing beyond that which is effected by the two-step VLC lift. There is a VCP/VLC system 22 for the engine intake and a VCP/VLC system 24 for the engine exhaust. The VCP/VLC systems 22, 24 are controlled by the control module, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used. As known to skilled practitioners, VCP/VLC systems have a limited range of authority over which opening and closings of the intake and exhaust valves can be controlled. Variable cam phasing systems are operable to shift valve opening time relative to crankshaft and piston position, referred to as phasing. The typical VCP system has a range of phasing authority of 30°-50° of cam shaft rotation, thus permitting the control system to advance or retard opening and closing of the engine valves. The range of phasing authority is defined and limited by the hardware of the VCP and the control system which actuates the VCP. The VCP/VLC system is actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to a signal ('INJ_PW') from the control module. The fuel injectors 28 are supplied pressurized fuel from a fuel distribution system (not shown).

The engine includes a spark ignition system by which spark energy is provided to a spark plug 26 for igniting or assisting in igniting cylinder charges in each of the combustion chambers, in response to a signal ('IGN') from the control module. The spark plug 26 enhances the ignition timing control of the engine at certain conditions (e.g., during cold start and near a low load operation limit).

The engine is equipped with various sensing devices for monitoring engine operation, including a crankshaft rotational speed sensor 42 having output RPM, a sensor 30 adapted to monitor combustion having output COMBUSTION, and, a sensor 40 adapted to monitor exhaust gases having output EXH, typically a wide range air/fuel ratio sensor. The combustion sensor comprises a sensor device operative to monitor a combustion parameter and is depicted as a cylinder pressure sensor to monitor in-cylinder combustion pressure. It is understood that other sensing systems used to monitor cylinder pressure or another combustion parameter which can be translated into combustion phasing are included within the scope of the invention, e.g., ion-sense ignition systems.

The engine is designed to operate un-throttled on gasoline or similar fuel blends with auto-ignition combustion ('HCCI combustion') over an extended range of engine speeds and loads. The engine operates in spark ignition combustion mode with controlled throttle operation with conventional or modified control methods under conditions not conducive to the HCCI combustion mode operation and to obtain maximum engine power to meet an operator torque request. Fueling preferably comprises direct fuel injection into the each of the combustion chambers. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present invention.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing includes negative valve overlap (NVO in an exhaust recompression strategy) and lift of exhaust valve reopening (in an exhaust re-breathing strategy). The control module is adapted to receive input signals from an operator (e.g., a throttle pedal position and a brake pedal position) to determine an operator torque request ($T_{O\_REQ}$) and from the sensors indicating the engine speed (RPM) and intake air temperature ($T_{IN}$), and coolant temperature and other ambient conditions. The control module 20 operates to determine, from lookup tables in memory, instantaneous control settings for spark timing (as needed), EGR valve position, intake and exhaust valve timing and/or lift set points, and fuel injection timing, and calculates the burned gas fractions in the intake and exhaust systems.

Figure 2:
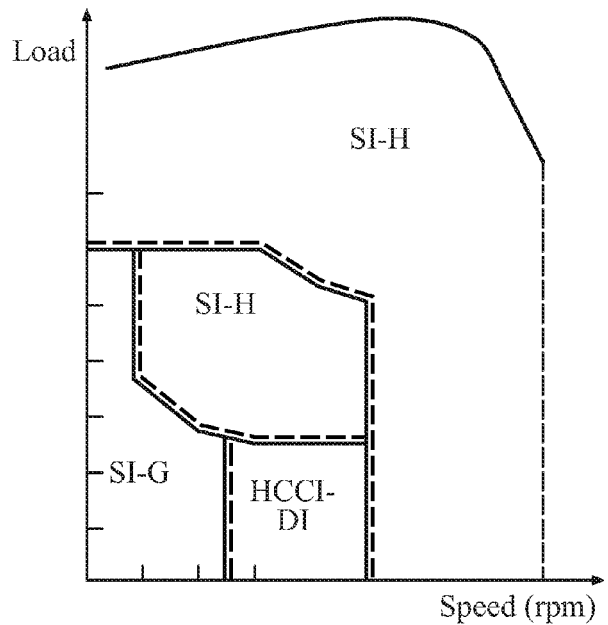
FIG. 2 is a data graph, in accordance with the present invention.

Referring now to FIG. 2, the exemplary engine is selectively operative in one of the combustion modes, based upon states of engine parameters, in this embodiment comprising speed (RPM) and load (LOAD) derivable from engine operating parameters such as engine fuel flow (INJ-PW in milligrams), or manifold pressure (MAP). The engine combustion modes comprise a spray-guided spark-ignition (SI-G) mode, a single injection auto-ignition (HCCI-SI) mode, and double injection auto-ignition (HCCI-DI) mode, and a homogeneous spark-ignition (SI-H) mode. A preferred speed and load operating range for each of the combustion modes is based upon optimum engine operating parameters, including combustion stability, fuel consumption, emissions, engine torque output, and others. Boundaries which define the preferred speed and load operating ranges to delineate the combustion modes are typically determined during pre-production engine calibration and development, and are executed in the engine control module as zones.

Figure 3:
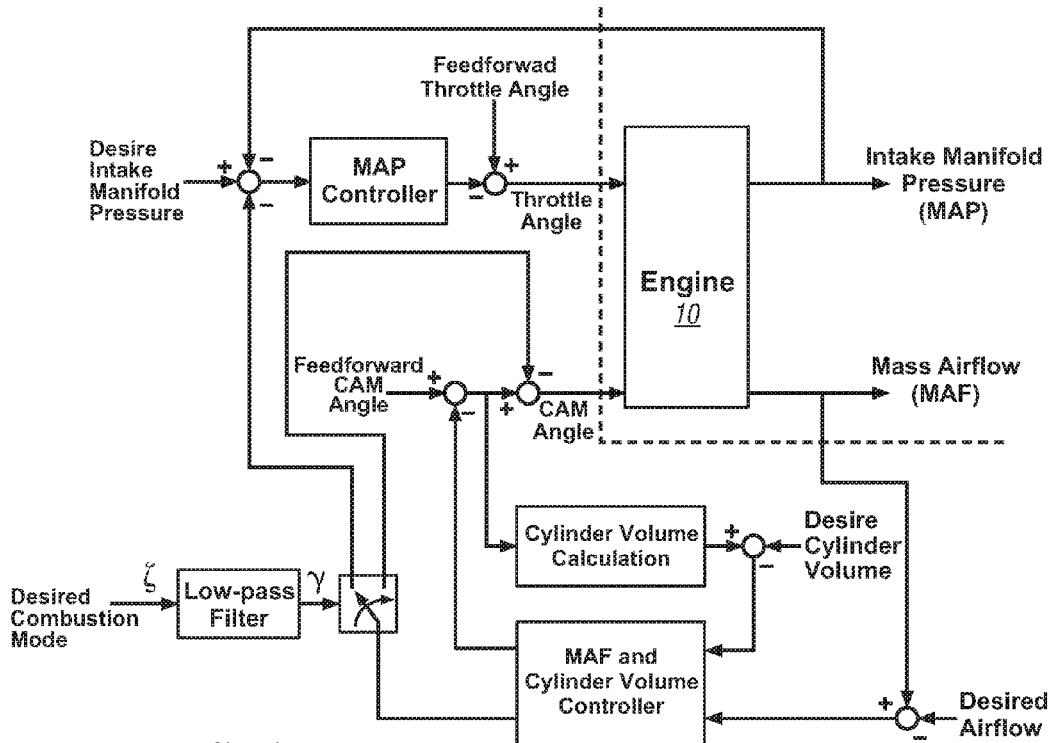
FIG. 3 is a schematic block diagram of a control scheme, in accordance with the present invention; and, FIG. 4 is a data graph, in accordance with the present invention.

Referring now to FIG. 3, an exemplary control scheme is now described, in accordance with the invention. The control scheme, executed as one or more algorithms in the control module, comprises a model-based control method for controlling mass airflow into the exemplary internal combustion engine 10 during transitions between the combustion modes, especially in transitions between the HCCI combustion mode and the SI combustion mode. The control scheme acts to determine desired states for mass airflow, intake manifold pressure, and cylinder volume to operate the engine in the second or targeted combustion mode. The desired states are determined based upon an operator torque request, typically in the form of operator inputs to throttle and brake pedals (not shown). Current states for mass airflow and intake manifold pressure are determined using the aforementioned MAF and MAP sensors 32, 36. Cylinder volume is determined at closing of the intake valve and closing of the exhaust valve using known cylinder geometry, based upon slider equations and crankshaft position. Opening position of the controllable throttle valve 34 is controlled. The openings and the closings of the intake and exhaust valves 20, 18, including, e.g., two-step valve lift and variable cam phasing, are controlled using the VCP/VLC systems 22, 24 during the transition to the second combustion mode based upon differences between the current states for mass airflow, intake manifold pressure, and cylinder volume, and, the mass airflow, the intake manifold pressure, and the cylinder volume to operate the engine in the second combustion mode and meet the operator torque request. This is now described in greater detail.

In operation, there is a command in the control system to change from one of the combustion modes to the other, second combustion mode, based upon a change in the engine speed/load operating point, as described with reference to FIG. 2. The desired combustion mode, represented by the symbol ζ, is input to a virtual filtered switch, wherein ζ represents the combustion mode, either 0 for the HCCI combustion mode, or 1 for the SI combustion mode. The virtual filtered switch comprises a first order lag filter, having an output γ, which ranges between 0 and 1. The desired mass airflow is determined by calculating a fueling rate necessary to meet the operator torque request, and a precalibrated air/fuel ratio. When the engine is operating in the SI combustion modes, the air/fuel ratio is controlled to λ=1, i.e., stoichiometry. When the engine is operating in the HCCI combustion modes, the air/fuel ratio is controlled to λ=1.6 to 1.9, i.e., lean of stoichiometry. Thus, the mass airflow is determined by combining the fueling rate and the air/fuel ratio for the desired combustion mode.

The second, or desired intake manifold pressure is determined based upon the desired combustion mode. When the target combustion mode is HCCI combustion, the desired manifold pressure is atmospheric or barometric pressure with the throttle angle at wide-open throttle. When the target combustion mode is SI combustion, the desired manifold pressure is determined based upon the engine load and engine fueling to achieve stoichiometric operation.

The second or desired cylinder volume is determined based upon the desired combustion mode, as is described hereinafter with reference to the equations and the control scheme.

The desired states for mass airflow, intake manifold pressure, and cylinder volume to operate the engine in the second or targeted combustion mode are input to the control scheme, along with feed-forward control of the throttle angle and the cam angle and lift. The control scheme calculates cylinder volume, monitors feedback from the MAP and MAF sensors, and determines desired states for MAP, MAF, and cylinder volume, which are combined with the feed-forward cam angle and lift, the feed-forward throttle angle, and the filtered combustion mode, γ, to provide control signal to the throttle 34 and the intake and exhaust VCP/VLCs 22, 24.

The model-based control method for controlling mass airflow into the exemplary internal combustion engine 10 during transitions between the combustion modes is now described in more detail.

A calculated value for mass flow rate of fresh air trapped in the cylinder at intake valve closing $\dot{m}_{air}$ is determined using the energy balance and ideal gas law. Intake manifold dynamics are considered minimal, as the intake manifold pressure is rapidly controlled by the throttle valve. Also, the amount of external EGR is considered as part of overall disturbance, and assumed to be zero. The mass airflow model is expressed as follows, in Eq. 1:

$$\dot{m}_{air} = \frac{p_i V_{IVC} - p_e V_{EVC}}{\tau R T_i} = \frac{-\Delta p V_{IVC} + p_e \Delta V}{\tau R T_i} = -\alpha u_1 + \beta u_2, \quad [1]$$

wherein:

$u_1 = \Delta p = p_e - p_i$;

$u_2 = \Delta V = V_{IVC} - V_{EVC}$;

$\alpha = \dfrac{V_{IVC}}{\tau R T_i}$;

$\beta = \dfrac{p_e}{\tau R T_i}$, and, wherein $p_i$ and $p_e$ are the pressures in intake and exhaust manifolds, respectively, $V_{IVC}$ and $V_{EVC}$ are the cylinder volumes at intake valve closing (IVC) and exhaust valve closing (EVC), respectively, $T_i$ is air temperature of intake manifold, i.e., $T_{IN}$, $\tau$ is the time elapsed for an engine cycle, and R is the gas constant. The pressure difference between intake and exhaust manifolds ($u_1$) and the cylinder volume difference between EVC and IVC ($u_2$) comprise the two inputs to the system. A multi-input multi-output (MIMO) controller is designed in accordance with the equations and control scheme to control the mass flow rate of the fresh air, $\dot{m}_{air}$, and the steady state cylinder volume difference, $\Delta V$. The mass flow rate, $\dot{m}_{air}$, is measured by the MAF sensor 32, and $\Delta V$ is calculated based on the intake and exhaust valve cam phasing angles and piston position related to the crankshaft angle. The dynamics of the MAF sensor are modeled by a first-order lag. In addition, two integrators are augmented in the model to remove steady state errors.

The overall state equations for the controller are expressed as follows, in Eq. 2:

$$\dot{x} = -\frac{1}{\kappa}x + \frac{1}{\kappa}\dot{m}_{air} = -\frac{1}{\kappa}x + \frac{1}{\kappa}(-\alpha(u_1^0 + \Delta u_1) + \beta(u_2^0 + \Delta u_2)) \quad [2]$$

$\dot{q}_1 = x - r_1$ $\dot{q}_2 = u_2^0 + \Delta u_2 - r_2$ wherein x is the measurement of the MAF sensor, $\kappa$ is its time constant, $u_1^0$ and $u_2^0$ are the feedforward part of the inputs to operate the engine in the auto-ignited engine, $\Delta u_1$ and $\Delta u_2$ are the feedback part, $r_1$ is the desired mass flow rate of the fresh air, and $r_2$ is the desired cylinder volume. By assuming constant states for $\alpha$ and $\beta$ (or slowly varying states over time), a robust, linear feedback control law $\Delta U = -KX$ wherein $\Delta U = [\Delta u_1, \Delta u_2]^T$, $X = [q_1, q_2]^T$ is designed based on the state equations using various control design methodologies.

As time, $t \to \infty$, the controller achieves $x \to r_1$ regardless of the combustion mode, while $\Delta p \to u_1^0$ is required in the auto-ignited combustion mode for unthrottled, lean operations. This is realized by implementing the feedback controller law $\Delta U$ as follows, in Eq. 3:

$$u_1 = \Delta p = u_1^0 + \gamma \Delta u_1 \quad [3]$$

$$u_2 = \Delta V = u_2^0 + \Delta u_2 - \frac{\alpha}{\beta}(1 - \gamma)\Delta u_1$$

$$\dot{\gamma} = -\frac{1}{\kappa_\gamma}\gamma + \frac{1}{\kappa_\gamma}\zeta.$$

In Eq. 3, above, the symbol $\zeta$ represents the combustion mode, as above, either 0 for the auto-ignited combustion mode, or 1 for the spark-ignited combustion mode. The symbol $\kappa_\gamma$ is the time constant of a low-pass filter that adjusts the changing rate of $\zeta$. Combining above equations together, one can verify that $\dot{m}_{air}$ is indeed still described by the same equation, shown with reference to Eq. 4:

$$\dot{m}_{air} = -\alpha(u_1^0 + \gamma\Delta u_1) + \beta\left(u_2^0 + \Delta u_2 - \frac{\alpha}{\beta}(1-\gamma)\Delta u_1\right) \quad [4]$$

$$= -\alpha(u_1^0 + \Delta u_1) + \beta(u_2^0 + \Delta u_2).$$

Here, as $t \to \infty$, $\Delta p \to u_1^0$ in the auto-ignited combustion mode ($\zeta = 0$).

Figure 4:
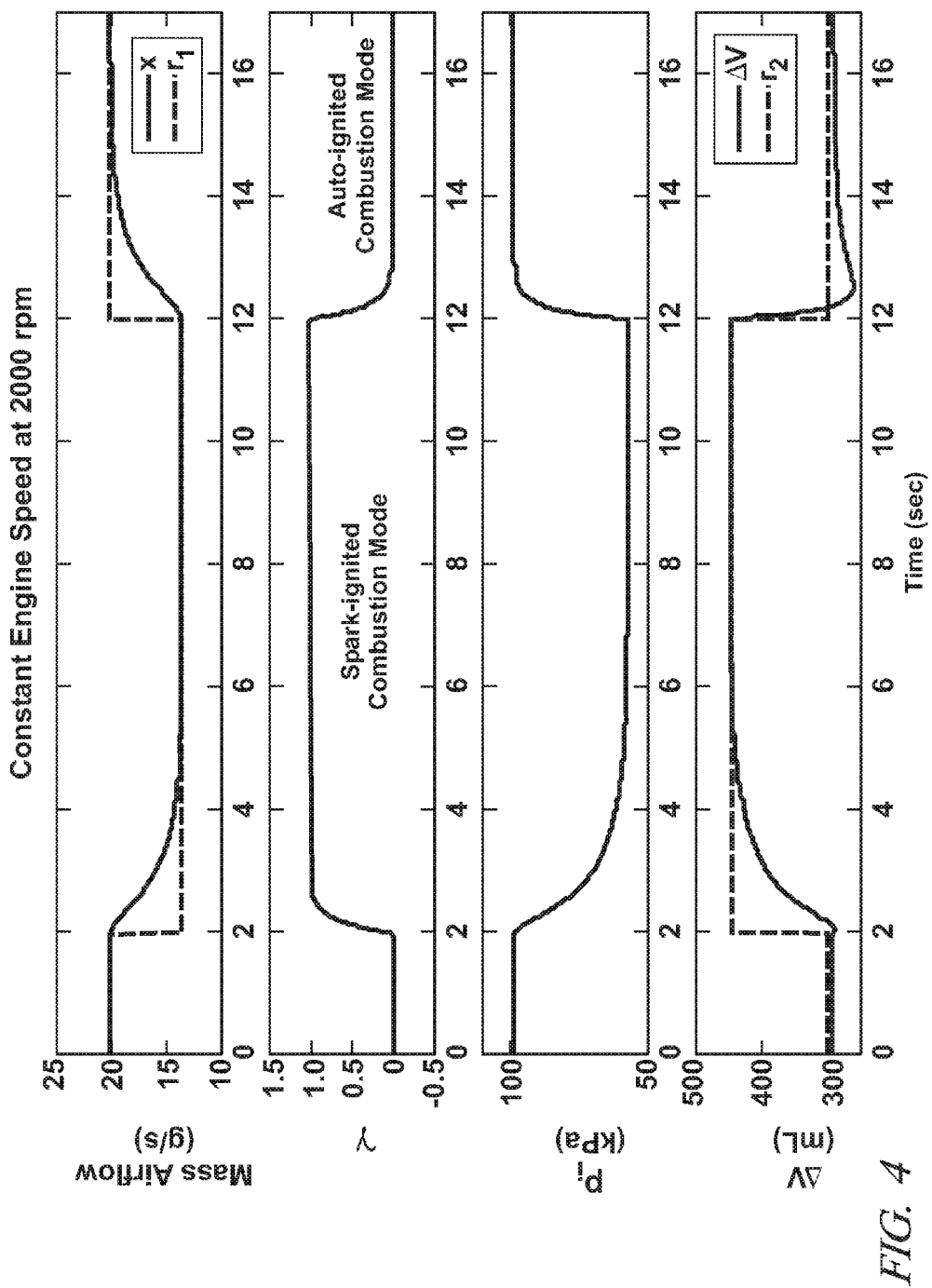

Referring now to FIG. 4, a closed-loop simulation result is depicted for the airflow control scheme described with reference to FIG. 3, designed using linearized quadratic regulator ('LQR') methodology. In the simulation depicted, engine speed was set to at 2000 rpm, with engine control transitioned between spark-ignition combustion mode and auto-ignition combustion mode, with the desired cylinder volume ($r_2$) changing based upon the combustion mode. The results, depicting mass airflow, filtered output $\gamma$, intake pressure $p_i$, and volume $\Delta V$ over time, indicate that the controller achieves $x \to r_1$ regardless of the combustion mode, and still achieves unthrottled conditions in the auto-ignited combustion mode.

To execute the above air flow management algorithms in the exemplary engine described hereinabove, the control inputs $\Delta p$ and $\Delta V$ are achieved by controlling the throttle position and the valve timing and profile, respectively. A low-level, high-bandwidth MAP controller is separately designed to control the throttle position to realize the control input $\Delta p$. The control input $\Delta V$ is realized by determining the angles of intake and exhaust cam-phaser so that $V_{IVC} - V_{EVC}$ is equal to $\Delta V$ while minimizing the effect of step changes of intake and exhaust valve profiles during the combustion mode transitions.

The control scheme includes controlling the controllable throttle valve to a wide-open-throttle position and controlling the openings and the closings of the intake and exhaust valves during the transition to the second combustion mode when the second combustion mode comprises the auto-ignition combustion mode.

The control scheme includes controlling the controllable throttle valve during the transition to the second combustion mode when the second combustion mode comprises the spark-ignition combustion mode.

While the invention has been described by reference to certain embodiments, it should be understood that changes are allowable within the spirit and scope of the inventive concepts described. Accordingly, it is intended that the invention not be limited to the disclosed embodiments, but that it have the full scope permitted by the language of the following claims.

The invention claimed is:
1. Method for controlling an internal combustion engine during a transition from a first combustion mode comprising one of a spark-ignition combustion mode and an auto-ignition combustion mode to a second combustion mode comprising the other of the spark-ignition combustion mode and the auto-ignition combustion mode, the internal combustion engine including a controllable throttle valve, a variable valve actuation system for controlling openings and closings of intake and exhaust valves, and, an intake and an exhaust, the method comprising:
   determining mass airflow, an intake manifold pressure, and a cylinder volume to operate the engine in the second combustion mode and meet an operator torque request;
   determining current states for mass airflow, intake manifold pressure, and cylinder volume; and,
   controlling an opening position of the controllable throttle valve and controlling the openings and the closings of the intake and exhaust valves during the transition from the first combustion mode to the second combustion mode based upon differences between the current states for mass airflow, intake manifold pressure, and cylinder volume, and, the mass airflow, the intake manifold pressure, and the cylinder volume to operate the engine in the second combustion mode and meet the operator torque request.

2. The method of claim 1, wherein determining the mass airflow to operate the engine in the second combustion mode to meet the operator torque request comprises determining a fueling rate to meet the operator torque request, and determining an air/fuel ratio during the transition.

3. The method of claim 1, wherein determining the intake manifold pressure to operate the engine in the second combustion mode comprises setting the intake manifold pressure to ambient pressure when the second combustion mode comprises the auto-ignition combustion mode.

4. The method of claim 1, wherein determining the cylinder volume to operate the engine in the second combustion mode further comprises determining cylinder volumes at closing of the intake valve and at closing of the exhaust valve based upon the mass airflow and the intake manifold pressure.

5. The method of claim 1, wherein controlling the openings and the closings of the intake and exhaust valves during the transition to the second combustion mode further comprises changing position of a two-step variable lift control device.

6. The method of claim 1, wherein controlling the openings and the closings of the intake and exhaust valves during the transition to the second combustion mode further comprises changing phasings of openings and closings of the intake valves and the exhaust valves.

7. The method of claim 1, further comprising controlling the controllable throttle valve to a wide-open-throttle position and controlling the openings and the closings of the intake and exhaust valves during the transition to the second combustion mode when the second combustion mode comprises the auto-ignition combustion mode.

8. The method of claim 1, further comprising controlling the controllable throttle valve during the transition to the second combustion mode when the second combustion mode comprises the spark-ignition combustion mode.

9. Method for controlling intake air flow for an engine, the engine including a controllable throttle valve, a variable valve actuation system for controlling opening and closing of intake and exhaust valves, and, an intake and an exhaust, the method comprising:
   commanding a transition from a first to a second combustion mode, wherein the first combustion mode comprises one of a spark-ignition combustion mode and an auto-ignition combustion mode and the second combustion mode comprises the other of the spark-ignition combustion mode and the auto-ignition combustion mode;
   determining a mass airflow, an intake manifold pressure, and a cylinder volume to operate the engine in the second combustion mode and meet an operator torque request;
   determining current states for mass airflow, intake manifold pressure, and cylinder volume; and,
   controlling an opening position of the controllable throttle valve and controlling the openings and the closings of the intake and exhaust valves during the transition to the second combustion mode based upon differences between the current states for mass airflow, intake manifold pressure, and cylinder volume, and, the mass airflow, the intake manifold pressure, and the cylinder volume to operate the engine in the second combustion mode and meet the operator torque request.

10. The method of claim 9, wherein determining the mass airflow to operate the engine in the second combustion mode to meet the operator torque request comprises determining a fueling rate to meet the operator torque request, and determining an air/fuel ratio during the transition.

11. The method of claim 9, wherein determining the intake manifold pressure to operate the engine in the second combustion mode comprises setting the intake manifold pressure to ambient pressure when the second combustion mode comprises the auto-ignition combustion mode.

12. The method of claim 9, wherein determining the cylinder volume to operate the engine in the second combustion mode further comprises determining cylinder volumes at closing of the intake valve and at closing of the exhaust valve based upon the mass airflow and the intake manifold pressure.

13. The method of claim 9, wherein controlling the openings and the closings of the intake and exhaust valves during the transition to the second combustion mode further comprises changing position of a two-step variable lift control device.

14. The method of claim 9, wherein controlling the openings and the closings of the intake and exhaust valves during the transition to the second combustion mode further comprises changing phasings of openings and closings of the intake valves and the exhaust valves.

15. The method of claim 9, further comprising controlling the controllable throttle valve to a wide-open-throttle position and controlling the openings and the closings of the intake and exhaust valves during the transition to the second combustion mode when the second combustion mode comprises the auto-ignition combustion mode.

16. The method of claim 9, further comprising controlling the controllable throttle valve during the transition to the second combustion mode when the second combustion mode comprises the spark-ignition combustion mode.

17. Method for controlling intake air flow for an engine during a transition between a spark-ignition combustion mode and an auto-ignition combustion mode, the method comprising:
   determining a mass airflow, an intake manifold pressure, and a cylinder volume to meet an operator torque request and operate the engine in the combustion mode to which it is transitioning;
   determining current states for mass airflow, intake manifold pressure, and cylinder volume; and,
   controlling an opening position of a controllable throttle valve and controlling openings and closings of intake and exhaust valves during the transition based upon differences between the current states for mass airflow, intake manifold pressure, and cylinder volume, and, the mass airflow, the intake manifold pressure, and the cylinder volume to meet the operator torque request and to operate the engine in the combustion mode to which it is transitioning.

18. The method of claim 17, further comprising controlling the controllable throttle valve to a wide-open-throttle position and controlling the openings and the closings of the intake and exhaust valves during the transition to the second combustion mode when the second combustion mode comprises the auto-ignition combustion mode.

19. The method of claim 17, further comprising controlling the controllable throttle valve during the transition to the second combustion mode when the second combustion mode comprises the spark-ignition combustion mode.

* * * * *